Aug. 20, 1935.  J. E. CHAMBERS  2,011,848
GAS STOVE
Filed Aug. 10, 1931  2 Sheets-Sheet 2

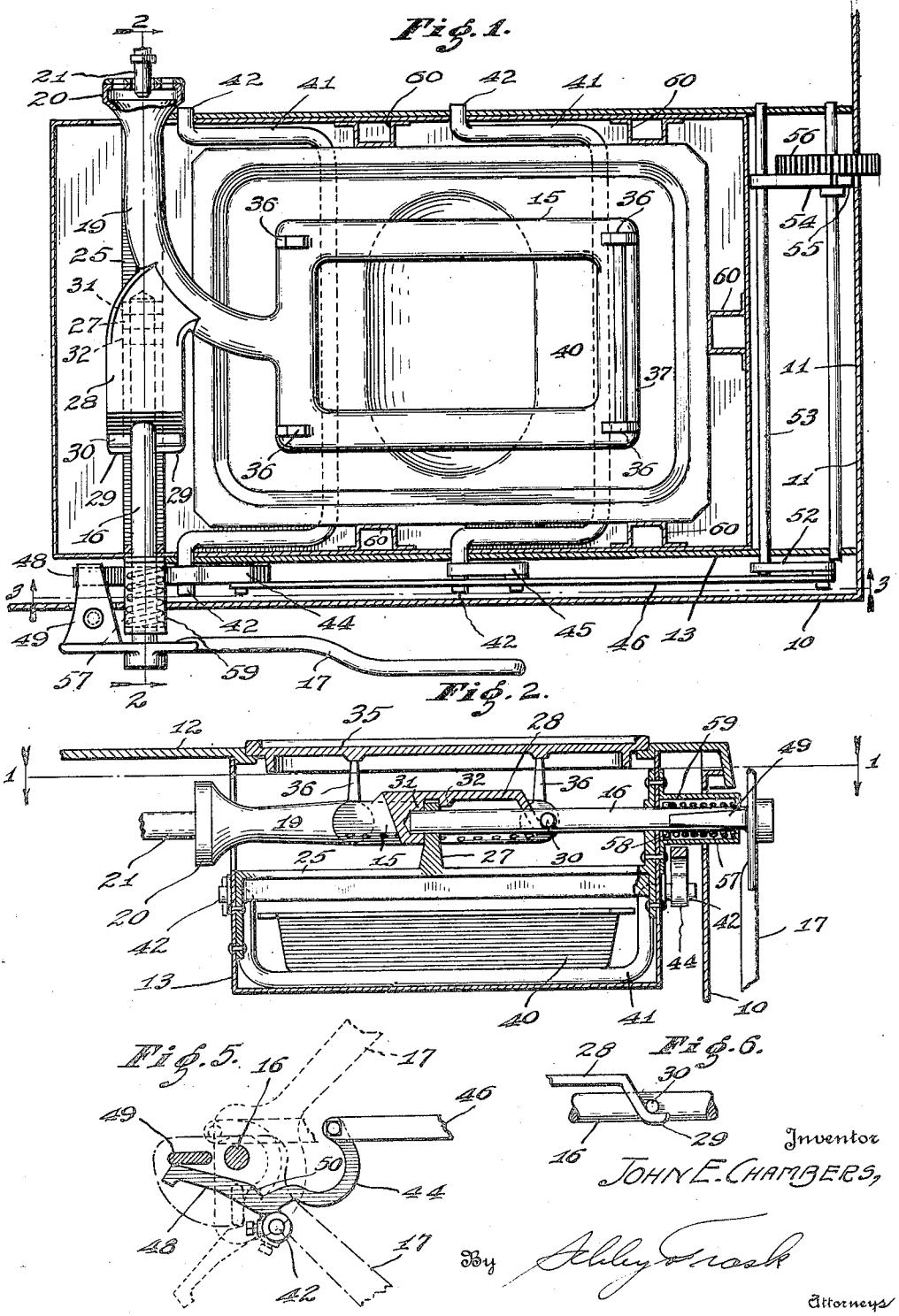

John E. Chambers,
Inventor

Patented Aug. 20, 1935

2,011,848

UNITED STATES PATENT OFFICE 2,011,848

GAS STOVE

John E. Chambers, Shelbyville, Ind.

Application August 10, 1931, Serial No. 556,234

11 Claims. (Cl. 126—41)

It is the object of my invention to produce a combined griddle and broiler for use in cooking. More specifically, it is my object to produce such a device which will be suitable for use in a gas range of the console type and in which the broiler, when in operation, will be concealed. A further object of my invention is to produce a broiler which, while concealed in operation, may be readily exposed in order that the progress of the broiling may be ascertained. Still another object of my invention is to produce a combined broiler and griddle in which both the broiler and griddle may be used simultaneously, heat for both being derived from a single heating element. Another object of my invention is to construct a range of the console type in which the broiler will be readily accessible.

In carrying out my invention, I mount the heating element, usually a gas-burner, so that it may be swung pivotally about a horizontal axis from a normal horizontal position to a position approximating vertical. Above the burner, and rotatable with it, I provide a griddle. When the device is embodied in a complete gas-range, the burner is located in an upwardly opening recess in the top of the range, and the griddle serves to cover the open top of such recess when the burner is in working position. Below the burner, in the recess, there is provided a broiler pan or other broiler support associated with which is mechanism for raising and lowering the broiler support. Preferably, a common operating means is provided for swinging the burner and the griddle from their normal horizontal position and for operating the broiler-moving mechanism to raise the broiler support to or toward the top of the recess in which it is located as the griddle and burner are moved from their working positions.

Figure 3:
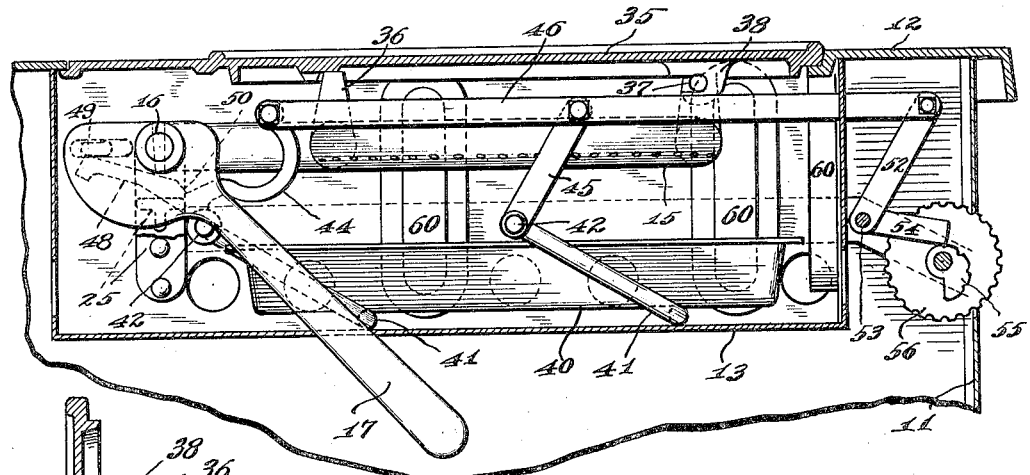
Figure 4:
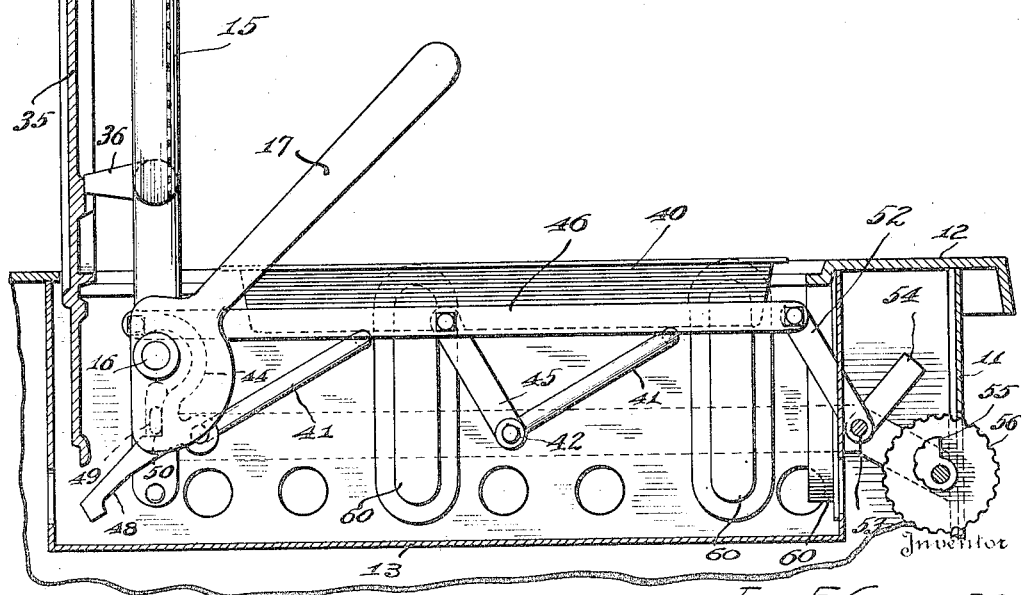

The accompanying drawings illustrate my invention: Fig. 1 is a horizontal section through a device embodying my invention on the line 1—1 of Fig. 2; Fig. 2 is a transverse vertical section through the broiling device on the line 2—2 of Fig. 1; Fig. 3 is a vertical longitudinal section on the line 3—3 of Fig. 1 showing the parts of the device in operative position; Fig. 4 is a view similar to Fig. 3, but with the broiler opened; Fig. 5 is a fragmental view showing an end elevation of the mechanism by which the broiler pan is raised; and Fig. 6 is a fragmental detail view illustrating the interconnection between the broiler burner and operating member by which it is raised and lowered.

While the broiler embodying my invention may be constructed as a separate unit, I prefer to embody it in a gas range including other cooking appliances. The device is so illustrated in the drawings, the range including an end wall 10, a front wall 11, and a cooking top 12. The parts of the broiler are retained in a broiler box 13 which has an open top and which is disposed beneath an opening, preferably of rectangular shape, in the cooking top 12.

A gas-burner 15 is disposed within the broiler box 13, such burner being pivotally mounted on a horizontal axis conveniently at or near the rear of the broiler box. This pivotal mounting of the burner 15 is conveniently effected by connecting it to a rock-shaft 16 which extends transversely of the broiler box near the rear thereof and which projects outwardly through the side of the broiler box and through the end wall 10 of the stove, its outer end being provided with an operating handle 17 by which it may be swung to raise or lower the burner 15.

To avoid the necessity for flexible conduits or stuffing boxes in connection with the supply of gas to the burner 15, I prefer to form the burner with a mixture-conduit 19 which terminates in the usual air-bell 20, such air bell being disposed concentric with the shaft 16. At its center, the air bell receives a stationary nozzle 21 through which gas is supplied to the burner 15 in the usual fashion, air being conducted through the customary openings provided in the air bell 20. By this means, the burner, when swung about its axis of pivotal mounting rotates about the axis of the shaft 16 and nozzle 21.

The shaft 16 is rotatably mounted in a bracket 25 which is shown as extending transversely of the broiler box and which is provided with feet secured to the side walls thereof. The foot at the outer end of the bracket 25 may provide a bearing for the outer end of the shaft 16, the inner end of the shaft 16 being supported in a bearing provided in an upwardly projecting ear 27 on the bracket 25. Rigid with the broiler burner 15 is a projection 28 which extends over the shaft 16, its outer end being formed to slope downwardly and being bifurcated to provide for the reception of the shaft 16, as is clear from Figs. 1, 2, and 6. At the extreme outer end of the projection 28, I provide abutments 29 adapted to lie below and substantially in contact with a transverse pin 30 in the shaft 16. The broiler burner 15 is prevented from movement transversely of the box by providing it with spaced shoulders 31 and 32 which receive between them the upper end of the ear 27. Conveniently, the shoulder 31 on the inner side of the ear 27 is provided with a recess adapted to receive the extreme inner end of the shaft 16.

From the construction described, it will be apparent that by operating the handle 17 to rock the shaft 16 the broiler burner 15 can be moved between the positions respectively illustrated in Figs. 3 and 4.

Mounted above the broiler burner is a griddle 35. As indicated in Figs. 2, 3, and 4, the griddle 35 is supported on the upper ends of four bosses 36 which project upwardly from the burner 15. These bosses are arranged in pairs, one pair being disposed near the rear of the burner 15, and the other pair near the front of the burner. Extending between the front pair of bosses 36 I have illustrated a rod 37 adapted to be received above curved fingers 38 formed on the lower side of the griddle 35. By this means, as is clear from Fig. 4, the griddle is definitely held in position relative to the burner 15 when the burner is elevated.

A broiler pan 40 or other broiler support is disposed in the broiler box 13 beneath the burner 15. This broiler pan is carried by mechanism so arranged that, while the pan occupies a position near the bottom of the broiler box 13 when the burner 15 is in its horizontal position, movement of the burner toward a vertical position will result in elevating the broiler pan to or toward the top of the broiler box 13. This pan-supporting and moving mechanism is conveniently a parallel-link mechanism formed by two U-shaped stirrups or yokes 41 pivoted on parallel spaced axes in the sides of the broiler box 13. The pivotal mounting of the yokes 41 is conveniently effected by bending outwardly the ends of their parallel legs to provide trunnions 42 which are received in suitable bearings in the side walls of the broiler box 13. As is clear from the drawing, the broiler pan 40 rests upon the intermediate legs of the two yokes 41. It will be apparent that as the two yokes are swung at equal rates about their respective axes the broiler pan will be raised or lowered in the broiler box 13.

For the purpose of swinging the yokes 41 and of maintaining them in proper angular relation, I mount respectively on the trunnions 42 on one side of the broiler box 13 arms 44 and 45, each of such arms being rigid with its associated yoke 41. At their outer ends, the arms 44 and 45 are interconnected by a link 46. The arms 44 and 45 are of the same effective length, and the distance between the points at which the links 46 are connected to such arms is equal to the distance between the axes of the yokes 41, so that the yokes 41 will therefore always maintain a parallel relation with each other and support the pan 40 in horizontal position.

For the purpose of adapting the yokes 41 for operation by the handle 17, the arm 44 is provided with a rigid rearward extension 48 adapted to be engaged by a finger 49 eccentrically positioned on the handle 17.

The operation of the mechanism just described will be apparent from Fig. 5, where the arm 44 is illustrated in full lines in the position it occupies when the pan 40 is at the bottom of the broiler box, the handle 17 being shown in chain-lines. The shaft 16 is disposed above and to the rear of the axis of the rear yoke 41, the trunnion 42 of which carries the arm 44. The finger 49 on the operating handle 17 is disposed above the outer end of the extension 48 and in rear of the shaft 16. If the handle 17 is swung about the axis of the shaft 16 in a counterclockwise direction to raise the burner 15, the finger 49 will force the arm 48 downwardly to swing the arm 44 in a counterclockwise direction, thus moving both the yokes 42 to raise the broiler pan 40. Because of the displacement between the axis of the shaft 16 (which is also the axis of the handle 17) and the axis about which the extension 48 swings, the finger 49 moves inwardly (to the right in Fig. 5) along the arm 48 as the handle 17 swings upwardly. At a point near the inner end of the extension 48 I off-set the upper surface thereof to provide a shoulder 50 adapted to pass below the projection 49 when the handle 17 reaches the upper limit of its movement. This shoulder 50, serves as a lock preventing accidental displacement of the parts when in the raised position illustrated in full lines in Fig. 4 and in dotted lines in Fig. 5.

Conveniently, some means is provided for varying the lower limit of movement of the pan 40 in order to control the distance between it and the burner 15. This means may take the form illustrated in Figs. 3 and 4. In this arrangement, the link 46 extends forwardly beyond its point of attachment to the arm 45 and is connected to an eccentric point on an arm 52 which is rigid with a transverse rock-shaft 53 mounted on a horizontal axis in front of the front wall of the broiler box. At some convenient point in its length, the shaft 53 carries a rigid arm 54 which extends forwardly and overlies a spiral cam 55 rigid with an adjusting member 56, the cam and adjusting member being jointly rotatable on a horizontal axis. The adjusting member 56 projects through an opening in the front wall 11 of the range so that it is accessible for adjustment.

The burner and broiler-support, or pan 40 are returned to their operative position, from that illustrated in Fig. 4 and in dotted lines in Fig. 5, by swinging the operating handle 17 in a clockwise direction. As the projection 49 moves rearwardly along the upper surface of the arm-extension 48, the links 41 swing downwardly under the influence of gravity and carry the pan 40 with them. Because of the engagement between the arm-extension 48 and the projection 49, the rate of descent of the pan 40 is controlled by the operating handle 17.

When the burner 15 reaches the lower limit of its movement, illustrated in Fig. 3, the griddle 35 becomes seated upon the edges of the opening in the cooking top 12, thus limiting further downward movement of the griddle. The burner 15, being connected to the griddle through the bosses 36, rod 37, and hooks 38, reaches the limit of its downward movement simultaneously with the griddle.

Should the mechanism, which limits downward movement of the pan 40 be set to interrupt such downward movement before the burner 15 and the griddle have returned to operative position, further downward movement of the burner and griddle will not be prevented. That is, when the pan 40 reaches the lower limit of its movement determined by the setting of the operating member 56 and the cam 55, the links 41, arms 44 and 45, and the arm-extension 48 stop moving, and as the operating handle continues to move downwardly, the projection 49 recedes from engagement with the arm-extension 48.

To permit ready removal of the burner, the shaft 16 is mounted for axial movement in order to permit its disengagement from the burner. When it is desired to remove the burner, the broiler is opened by swinging the griddle and burner to the vertical position illustrated in Fig.

4. The griddle is then removed by disengaging the hooks 38 from the rod 37. If the shaft 16 is now moved axially outward until its inner end passes out of the recess in the shoulder 31 the burner may be readily removed. Conveniently, the shaft 16 is held in its normal position illustrated in Fig. 2 by means of a spring 57 which operates between an abutment 58 on the shaft and a stirrup 59 which is secured on the outer face of the side wall of the broiler box 13.

I find it convenient to provide within the broiler box 13 guides 60 which prevent the broiler pan 40 from becoming displaced on the supporting links 41. As is clear from Fig. 1 five of these guides are shown, there being two on each sidewall of the broiler box and one on the front wall thereof.

I claim as my invention:—

1. A broiling appliance, comprising a broiler compartment having an open top, a heating element pivotally mounted on a horizontal axis to swing into and out of said compartment, a broiler support, and means for supporting said broiler support in co-operative heat-receiving relation with and below said heating element when the latter is in said compartment, said means including mechanism operable jointly to swing said heating element out of said compartment and to raise said broiler support toward the top thereof.

2. A broiling appliance as set forth in claim 1 with the addition of adjustable means for limiting downward movement of said broiler support in said compartment.

3. A cooking appliance, comprising a support for the material to be cooked, a burner pivotally mounted adjacent said support, a stationary bracket, said burner and said stationary bracket having co-operating provisions for holding said burner in definite axial position, said burner having an axial recess, and a member mounted for longitudinal movement relative to said bracket and receivable in said recess to retain said burner in place.

4. A cooking appliance as set forth in claim 3 with the addition that said member is rotatable in said bracket, said member and burner having interengaging means interconnecting them for joint rotation.

5. A cooking appliance, comprising a burner pivotally mounted to swing upwardly from an operative horizontal position, a griddle, and means carried by said burner and griddle for interconnecting them for joint swinging movement about the pivotal axis of the burner, said means being disengageable by movement of said griddle parallel to said burner.

6. A broiling appliance, comprising a broiler compartment, a heating element pivotally mounted on a horizontal axis and swingable from an operative position, a broiler support, means for supporting said broiler support in co-operative heat-receiving relation with and below said heating element when the latter is in operative position, said means including mechanism for raising and lowering said broiler support in said compartment, and provisions operatively interconnecting said heating element and said mechanism to raise the broiler support when said element is swung away from its operative position.

7. A broiling appliance, comprising a broiler compartment, a heating element pivotally mounted on a horizontal axis and swingable from an operative position, a broiler support, means for supporting said broiler support in co-operative heat-receiving relation with and below said burner when the latter is in operative position, said means including mechanism for raising and lowering said broiler support in said compartment, and common operating means for swinging said heating element from operative position and for raising said broiler support in said compartment.

8. A broiling appliance, comprising a broiler compartment, a heating element pivotally mounted on a horizontal axis and swingable from an operative position, a broiler support, means for supporting said broiler support in co-operative heat-receiving relation with and below said heating element when the latter is in operative position, said means including mechanism for raising and lowering said broiler support in said compartment, provisions operatively interconnecting said heating element and said mechanism to raise the broiler support when said element is swung away from its operative position, and a griddle movable with said heating element and disposed thereabove when said heating element is in operative position.

9. A broiling appliance, comprising a broiler compartment, a heating element pivotally mounted on a horizontal axis and swingable from an operative position, a broiler support, means for supporting said broiler support in co-operative heat-receiving relation with and below said heating element when the latter is in operative position, said means including mechanism for raising and lowering said broiler support in said compartment, common operating means for swinging said heating element from operative position and for raising said broiler support in said compartment, and a griddle movable with said heating element and disposed thereabove when said heating element is in operative position.

10. A broiling appliance, comprising a broiler compartment having an open top, a heating element pivotally mounted on a horizontal axis and swingable from an operative position, a broiler support, means for supporting said broiler support in co-operative heat-receiving relation with and below said heating element when the latter is in operative position, said means including mechanism for raising and lowering said broiler support in said compartment, provisions operatively interconnecting said heating element and said mechanism to raise the broiler support when said element is swung away from its operative position, and a griddle movable with said heating element and arranged to form a closure for the open top of said compartment when said heating element is in operative position.

11. A broiling appliance, comprising a broiler compartment having an open top, a heating element pivotally mounted on a horizontal axis and swingable from an operative position, a broiler support, means for supporting said broiler support in co-operative heat-receiving relation with and below said heating element when the latter is in operative position, said means including mechanism for raising and lowering said broiler support in said compartment, common operating means for swinging said heating element from operative position and for raising said broiler support in said compartment, and a griddle movable with said heating element and arranged to form a closure for the open top of said compartment when said heating element is in operative position.

JOHN E. CHAMBERS.